United States Patent

Zievers et al.

[11] Patent Number: 5,185,018
[45] Date of Patent: Feb. 9, 1993

[54] STRUCTURAL FIBROSICS

[76] Inventors: Elizabeth S. Zievers; James F. Zievers, both of 1240 Carriage La., Lagrange, Ill. 60525

[21] Appl. No.: 787,243
[22] Filed: Nov. 4, 1991
[51] Int. Cl.$^5$ .................. B01D 46/24; C04B 41/50
[52] U.S. Cl. .................. 55/341.1; 55/523; 428/936
[58] Field of Search .............. 55/302, 341.1, 341.2, 55/523; 427/249, 255; 428/936

[56] References Cited

U.S. PATENT DOCUMENTS

| | | | |
|---|---|---|---|
| 2,667,233 | 1/1954 | Vedder | 55/341.2 X |
| 3,982,100 | 9/1976 | Hervert | 427/249 X |
| 3,995,143 | 11/1976 | Hervert | 427/249 X |
| 4,174,331 | 11/1979 | Myles | 260/29.1 R |
| 4,343,631 | 8/1982 | Ciliberti | 55/302 |
| 4,488,920 | 12/1984 | Danis | 427/249 X |
| 4,500,602 | 2/1985 | Patten et al. | 428/408 |
| 4,568,594 | 2/1986 | Hordonneau | 428/113 |
| 4,619,866 | 10/1986 | Smith et al. | 427/249 X |
| 4,642,271 | 2/1987 | Rice | 428/698 |
| 4,692,176 | 9/1987 | Israelson | 55/302 |
| 4,735,638 | 4/1988 | Ciliberti et al. | 55/302 |
| 4,737,176 | 4/1988 | Lippert | 55/480 |
| 4,761,323 | 8/1988 | Mühlratzer et al. | 427/249 X |
| 4,824,711 | 4/1989 | Cagliostro et al. | 427/255 X |
| 4,857,489 | 8/1989 | Bearden | 501/95 |
| 4,960,448 | 10/1990 | Zievers | 55/523 |
| 4,960,449 | 10/1990 | Yonushonis | 55/523 |
| 4,965,101 | 10/1990 | Frei et al. | 427/255 |
| 4,968,467 | 11/1990 | Zievers | 55/523 X |
| 5,071,457 | 12/1991 | Schmidt, Jr. et al. | 55/523 |
| 5,075,160 | 12/1991 | Stinton et al. | 427/249 X |
| 5,076,054 | 12/1991 | Akimune et al. | 427/249 X |
| 5,082,480 | 1/1992 | Dorazio | 55/523 |

FOREIGN PATENT DOCUMENTS 1476481 6/1977 United Kingdom .

Primary Examiner—Robert Spitzer
Attorney, Agent, or Firm—Edmond T. Patnaude

[57] ABSTRACT

A strong and light weight tubular structural member is formed of a fibrous ceramic mat-like skeletal base filled with a ceramic binder. The ceramic filled base is coated in a chemical deposition process with a thin ceramic skin which is molecularly bonded to the base and which greatly strengthens the member and increases its useful life when it is used in contact with high temperature furnace gasses. The use of such tubular members in cross-flow filter elements to separate planar ceramic filter elements and the use thereof to strengthen ceramic tube sheets in pressure type tube filters is disclosed.

2 Claims, 1 Drawing Sheet

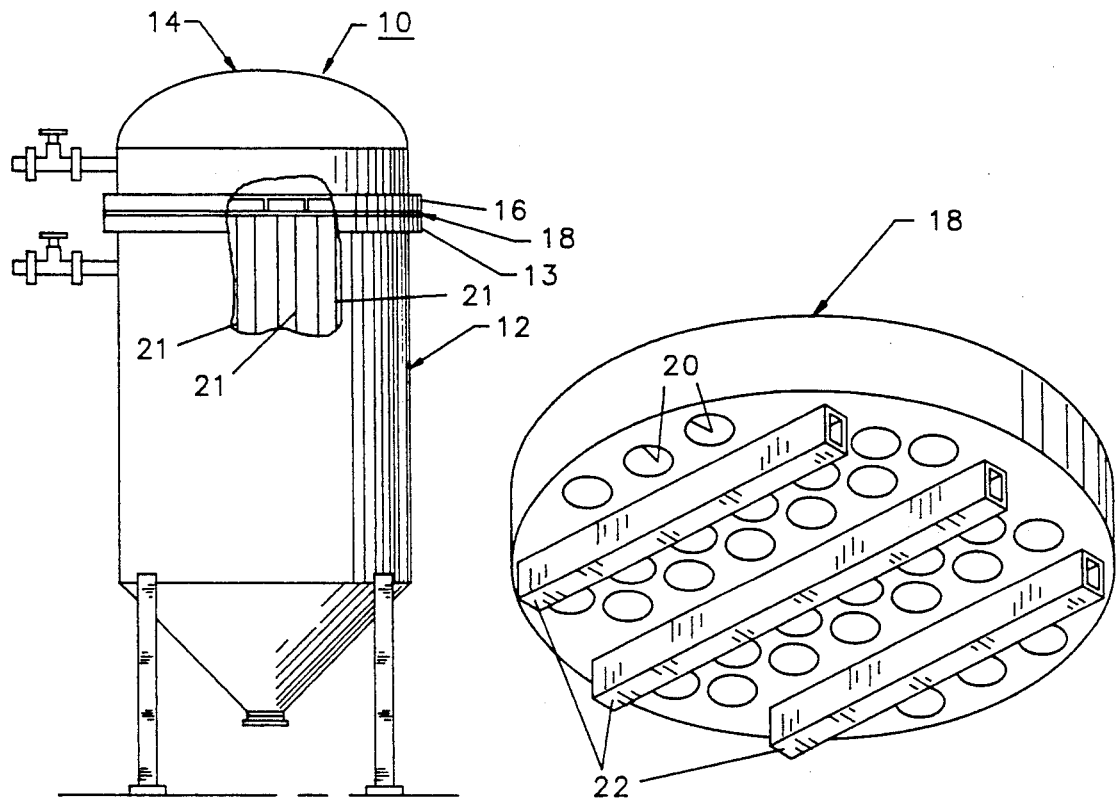
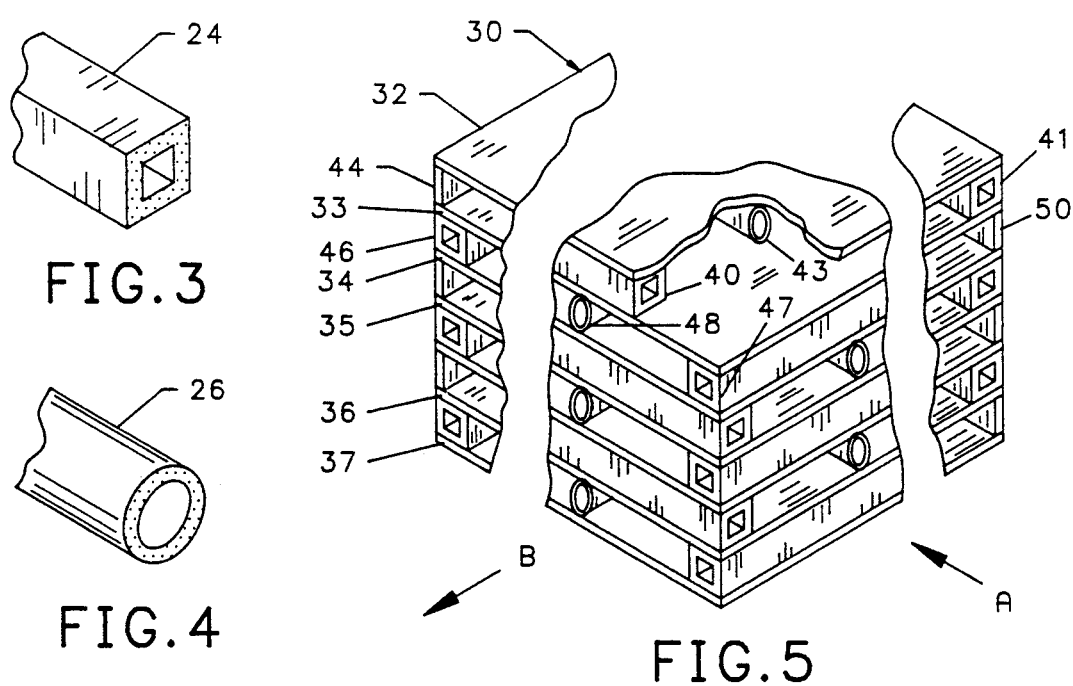

STRUCTURAL FIBROSICS

The present invention relates in general to high temperature gas filters, and it relates more particularly to ceramic structural members which are light in weight, durable in construction and adapted for use in such filters. Preferably, such structural members are tubular.

BACKGROUND OF THE INVENTION

The use of ceramic gas filter elements in high temperature applications is well known. Such filters elements have been relatively heavy and have necessitated the use of massive structural members to support them properly at high temperatures within a filter tank. It has recently been found that the weight of the filter elements can be greatly reduced by constructing the elements of a ceramic filled skeletal base formed of matted ceramic fibers. However, it has still been necessary to utilize heavy structural members to support such filter elements inasmuch as the tube sheets which support the ceramic filter elements have been formed of metal. Attempts to use ceramic structural members to support the ceramic filter elements have not been altogether successful because of the fragile nature of traditional ceramics and the susceptibility thereof to corrosion when subjected to high temperature combustion gasses.

Nevertheless, ceramic structural members have an important advantage over metal structural members. Being of the same basic material as the filter elements with which they are used the structural members expand and contract simultaneously with the filter elements to reduce stress on the filter elements and to facilitate sealing of the filter elements to the structural support members.

SUMMARY OF THE INVENTION

Briefly, there is provided in a preferred embodiment of the present invention a new and improved ceramic structural member and a method of constructing it. The member is tubular and has a ceramic filled, ceramic fiber base to which an integral ceramic skin is applied in a chemical deposition process. The structural member of the present invention is light in weight as compared to the metal or molded ceramic members known in the prior art, it is considerably less fragile than a molded ceramic member, it has a substantially greater shear strength than a molded ceramic member, and it is less affected by high temperature combustion gasses.

In accordance with another aspect of the present invention there is provided a novel ceramic tube sheet invention which includes tubular ceramic structural members of the present invention bonded to one side of a planar ceramic support member having a plurality of through-holes in which a plurality of ceramic filter elements are mounted.

In another embodiment of the invention a plurality of the tubular ceramic structural members of the present invention are incorporated in a cross-flow filter element to space a plurality of thin ceramic filter membranes from one another and to strengthen and rigidify the filter element.

GENERAL DESCRIPTION OF THE DRAWINGS

Further objects and advantages and a better understanding of the present invention will be had by reference to the following detailed description taken in connection with the accompanying drawings wherein:

FIG. 1 is a fragmentary view of a tubular type pressure filter embodying the present invention;

FIG. 2 is an isometric view of the tube sheet used in the filter of FIG. 1;

FIG. 3 is a fragmentary isometric view of an alternative structural member which may be used in the embodiment shown in FIG. 2;

FIG. 4 is a fragmentary isometric view of still another structural member which may be used in the embodiment of the invention shown in FIG. 2; and FIG. 5 is a fragmentary view of a cross-flow filter element embodying the present invention.

DETAILED DESCRIPTION OF A PREFERRED EMBODIMENT OF THE INVENTION

Referring to FIG. 1, there is shown a portion of a tube filter 10 which consists of a generally cylindrical pressure tank 12 having an integral annular flange 13 at the top. A cover member 14 having an integral external flange 16 at its lower end is mounted over the open top of the tank 12. A filter element support sheet 18, which is shown in greater detail in FIG. 2, is sealably mounted between the flanges 13 and 16 and separates the chamber in the tank 12 from the chamber in the cover 14. Filters of this general construction are well known in the art and a filter of this general type is described in U.S. Pat. No. 3,240,347.

The tube sheet 18 is provided with a plurality of vertically extending through-holes 20 in which a plurality of ceramic tubular filter elements 21 are mounted and depend into the tank 12 with the open upper ends of the filter elements opening into the cover 14.

In accordance with an important aspect of the present invention the tube sheet 18 is formed of a ceramic material so as to have the same coefficient of expansion as that of the filter elements 21. The tube sheet 18 is preferably light in weight and is impervious to the gasses which are passed into and through the filter elements during the gas filtration process. More particularly, the tube sheet 18 includes a skeletal core member formed of a multiplicity of randomly oriented ceramic fibers which are bonded together to form a mat like member. The spaces between the fibers are filled with a ceramic binder. While such a member is light in weight and has the same coefficient of expansion as that of the filter elements, it is relatively weak and is unsuited for supporting the large number of filter tubes commonly used in filters of this type. Consequently, a plurality of strong, light weight structural ceramic members 22 are integrally bonded to one or both of the horizontal surfaces of the tube sheet 18 to provide the assembly with sufficient strength to support the filter elements. Also, being formed entirely of ceramic, they have the same coefficient of expansion as that of the tube sheet 18. In the preferred embodiment of the invention the structural members 22 are tubular and rectangular in cross section. They are identical in construction and extend in mutually parallel relationship. Each of the members 22 is formed in a process wherein a skeletal base of randomly oriented ceramic fibers are bonded together to form a mat-like member. The interstices between the fibers are filled with a ceramic binder in the same way in which the spaces between the ceramic fibers in the sheet 18 are filled with a binder. However, in order to provide the members 22 with the necessary structural strength to permit use of the member 18 as a tube sheet, the members 22 are respectively coated by a chemical vapor deposition process with a thin layer of ceramic.

Because of the size and cost of a chemical deposition chamber, it is not practical to use a chemical deposition process to deposit a layer of ceramic on the tube sheet 18 itself. However, it is possible to provide such a coating on the elongate structural members 22 in an economical manner. The chemical vapor deposition process may be used to deposit the ceramic layer on either the outside surface of the member 22 while in some cases it may be desirable to provide the coating on both the inner and outer sides where greater structural strength is required. It will be understood that the strength of the members 22 is greatly increased by virtue of this chemical vapor deposited ceramic layer. Also, this very tight ceramic layer is not readily attacked by the high temperature gasses commonly encountered by this type of filter, and therefore, the life of the tube sheet assembly is substantially increased.

Preferably the ceramic material which is chemically deposited on the underlying ceramic member can be aluminum oxide, silicon carbide, silicon nitride, titanium carbide, zirconium carbide, zirconium oxide and zirconium nitride. The particular coating material is chosen for compatibility with the process and the corrosion to be encountered because of the temperature and the nature of the gasses to be filtered.

Referring to FIG. 3 there is shown a portion of an elongate structural member 24 which is similar in construction to the two rectangular tubular members 28 shown in FIG. 2, but which is square in cross section.

In FIG. 4 there is shown another structural member 26 similar to the structural members 22 as shown in FIG. 2, but which is circular in cross section.

Referring to FIG. 5, there is shown a portion of a crossflow filter element 30 having the same general construction as the crossflow filter element shown in FIGS. 1a and 1b of U.S. Pat. No. 4,343,631. Such a filter element comprises a plurality of thin filter sheets or membranes 32 which are spaced from one another by members which permit the flow of the gas to be filtered to pass into the space between alternate pairs of the planar filter elements 32 and out through other alternate ones of the membranes after passing through at least one of the membranes. It will be understood that the gas to be filtered enters from one side of the element and exits from one of the other sides which is perpendicular to the first side. As shown in FIG. 5, the cross flow filter element 30 comprises a plurality of thin planar filter membranes 32, 33, 34, 35, 36 and 37. Each of these membranes is preferably formed of ceramic and may be formed by the same process used to manufacture the tube sheet 18. The membranes are sufficiently porous to permit the gas to be filtered to pass therethrough while collecting particulates entrained in the gas. As shown, the upper two filter sheets 32 and 33 are spaced apart by first and second rectangular tubular structural members 40 and 41 which are preferably square in cross section and of the same general construction as that of the structural member 24 in FIG. 3. Interposed between the end members 40 and 41 is one or more structural and spacer members 43 of the construction shown in FIG. 4. The use of the cylindrical spacers 43 between the rectangular end spacers 40 and 41 provides the filter elements with a substantially greater effective surface area than would be the case if, for example, the rectangular structural members were being used.

Gas to be filtered enters the cross-flow filter element through the space between the spacer elements. The front right ends of these elements are preferably closed by any suitable means not shown. At the rear left side of the filter element as shown in FIG. 5 an impervious wall member 44, which is also constructed in the manner as the structural elements 40, 41 and 43, is positioned against and sealably affixed to the filter elements 32 and 33. The filter elements 33 and 34 are spaced apart by first and second rectangular structural members 46 and 47 and one or more intermediate cylindrical structural members 48. The members 46, 47 and 48 are mutually parallel and extend at right angles to the structural members 40, 41 and 43. The right hand rear end of the space between the filter elements 33 and 34 is closed by a wall member 50 also formed in the same manner as the structural members 40, 41 and 43 are formed. As a result of this construction the gas enters the space between the upper filter elements 32 and 33 in the direction of the arrow A and flows downwardly through the filter element 33 into the space between the filter elements 33 and 34 from which it flows outwardly in the direction shown by the arrow B in FIG. 5. In a similar manner alternate ones of the other filter elements are spaced apart by the structural members.

Inasmuch as these structural members which space the filter elements from one another are impervious to gas and are strong and rigid in construction, the crossflow filter element is light in weight and yet strong and durable and not susceptible to the corrosive effects of the hot gasses being filtered.

The tubular structural members described hereinabove are preferably formed in the following manner. The fibrous, mat-like skeletal form is made in a vacuum forming operation wherein an aqueous colloidal alumina or silica slurry of the binder and short random lengths of ceramic fibers are pulled by a vacuum onto a mold or mandrel. The skeletal form is then heat treated to dry the binder which thus binds the fibers together into an integral skeletal form. The skeletal form is then immersed in an alpha alumina and/or silica bath. Thereafter the form removed from the bath and is again heat treated to provide a relatively nonporous, rigid member which is relatively light in weight when compared with a metal or ceramic member having a comparable bending strength at the high temperatures encountered during use of the filter.

The structural members are then placed in a chemical vapor deposition vacuum chamber wherein a coating of ceramic material having a thickness in the order of one to ten millimeters is deposited onto one or more of the external surfaces of the member. If desired and where additional strength is required, both the inside and outside surfaces of the tubes may also be coated in the same process.

The ceramic coating which is deposited in the chemical vapor deposition process is preferably aluminum oxide, silicon carbide, silicon nitride, mullite or cordierite and has a thickness in the range of .0015 to .03 inch.

The refractory fibers which form the skeletal base of the members may be alumina silica, and if very pure will have the following composition:

| | |
|---|---|
| $Al_2O_3$ | 48.2% |
| $SiO_2$ | 48.2% |
| $TiO_2$ | 1.1% |
| $Fe_2O_3$ | 0.5% |

Still purer aluminum oxide fibers having the following composition may, however, be used:

| | |
|---|---|
| Al$_2$O$_3$ | 94% |
| SiO$_2$ | 3% |

The binder is preferably either colloidal alumina or colloidal silica. If a colloidal silica is used with the less pure alumina silica fibers the skeletal form has the following composition:

| | |
|---|---|
| Al$_2$O$_3$ | 30.5% |
| SiO$_2$ | 67.7% |
| TiO$_2$ | 1.1% |
| Fe$_2$O$_3$ | 0.5% |

After the skeletal form has been coated with colloidal alpha alumina or colloidal silica it is preferably dried at a temperature in the range of 1700 degrees F. to 2300 degrees F. At the higher temperatures the coating is converted to the mullite phase which increases it resistance to corrosive attack by the hot gasses during use of the filter element.

This same basic process is preferably used for making the tube sheet 18 except that the chemically deposited ceramic coating whereas is not provided. Similarly, the filter tubes 20 and the filter elements 32-35 may be similarly formed so as to be light in weight as compared to molded ceramic filter elements.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

We claim:

1. A filter element for removing entrained particulates from a high temperature gas, comprising in combination a plurality of thin porous members formed of ceramic fibers bonded together into an integral member, a first plurality of tubular structural members disposed against one side of one of said thin porous members and bonded thereto, said tubular structural members being rectilinear and extending in mutually parallel relationship, a second plurality of tubular structural members disposed against the other side of said one of said thin porous members and bonded thereto, said second plurality of tubular members being in mutual parallel relationship and extending orthogonally with respect to said first plurality of tubular structural members, said tubular structural members being formed by vacuum forming a skeletal base of randomly oriented ceramic fibers and a liquid ceramic binder, heat drying said base to bond said fibers together, then immersing said base in a liquid ceramic bath, removing said base from said bath, then heat treating said base to provide a substantially rigid member, and then depositing on an external surface of said rigid member a coating of ceramic material in a chemical deposition process.

2. A tube sheet for use in a pressure filter having a plurality of tubular filter elements through the walls in which a hot gas is adapted to flow in order to remove particulates entrained in said gas, comprising in combination a rigid planar member formed of ceramic fibers bonded together and filled with a ceramic material, said planar member having a plurality of holes extending therethrough for receiving said filter elements, a plurality of tubular structural members bonded to one side of said planar member, said tubular structural members being formed by vacuum forming a skeletal base of randomly oriented ceramic fibers and a liquid ceramic binder, heat drying said base to bond said fibers together, then immersing said base in a liquid ceramic bath, removing said base from said bath, then heat treating said base to provide a substantially rigid member, and then depositing on an external surface of said rigid member a coating of ceramic material in a chemical deposition process.

* * * * *